Jan. 5, 1937.  A. C. HOFFMAN  2,067,086
BRAKE LINING DEVICE
Filed June 12, 1935  2 Sheets-Sheet 2
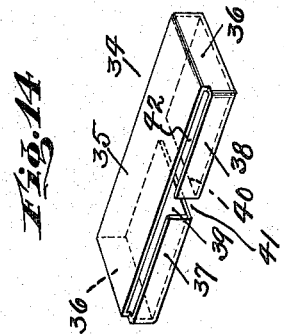
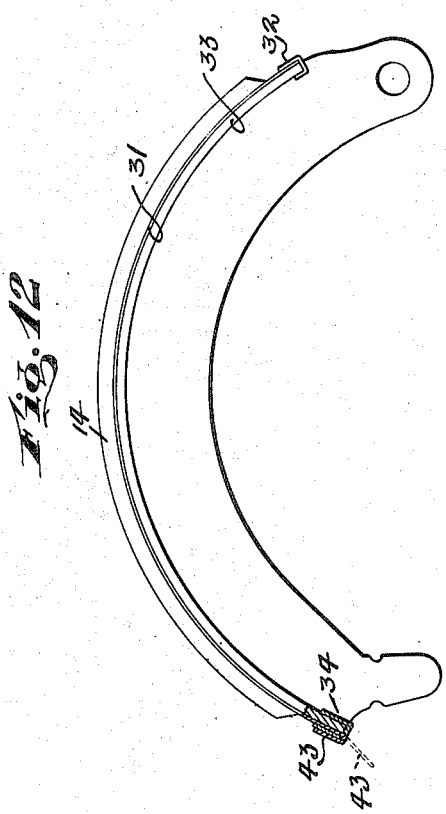
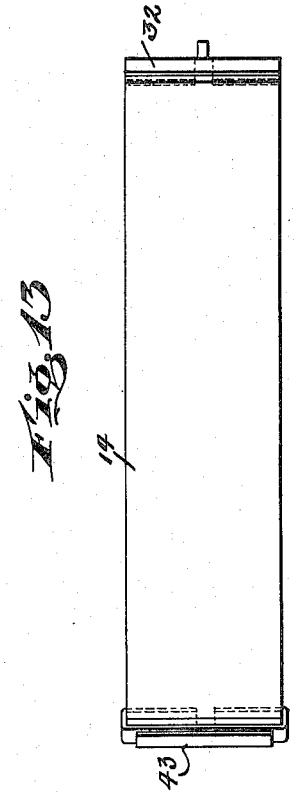
INVENTOR
Allan C. Hoffman.
BY
Kiddle, Bethell and Montgomery
ATTORNEYS.

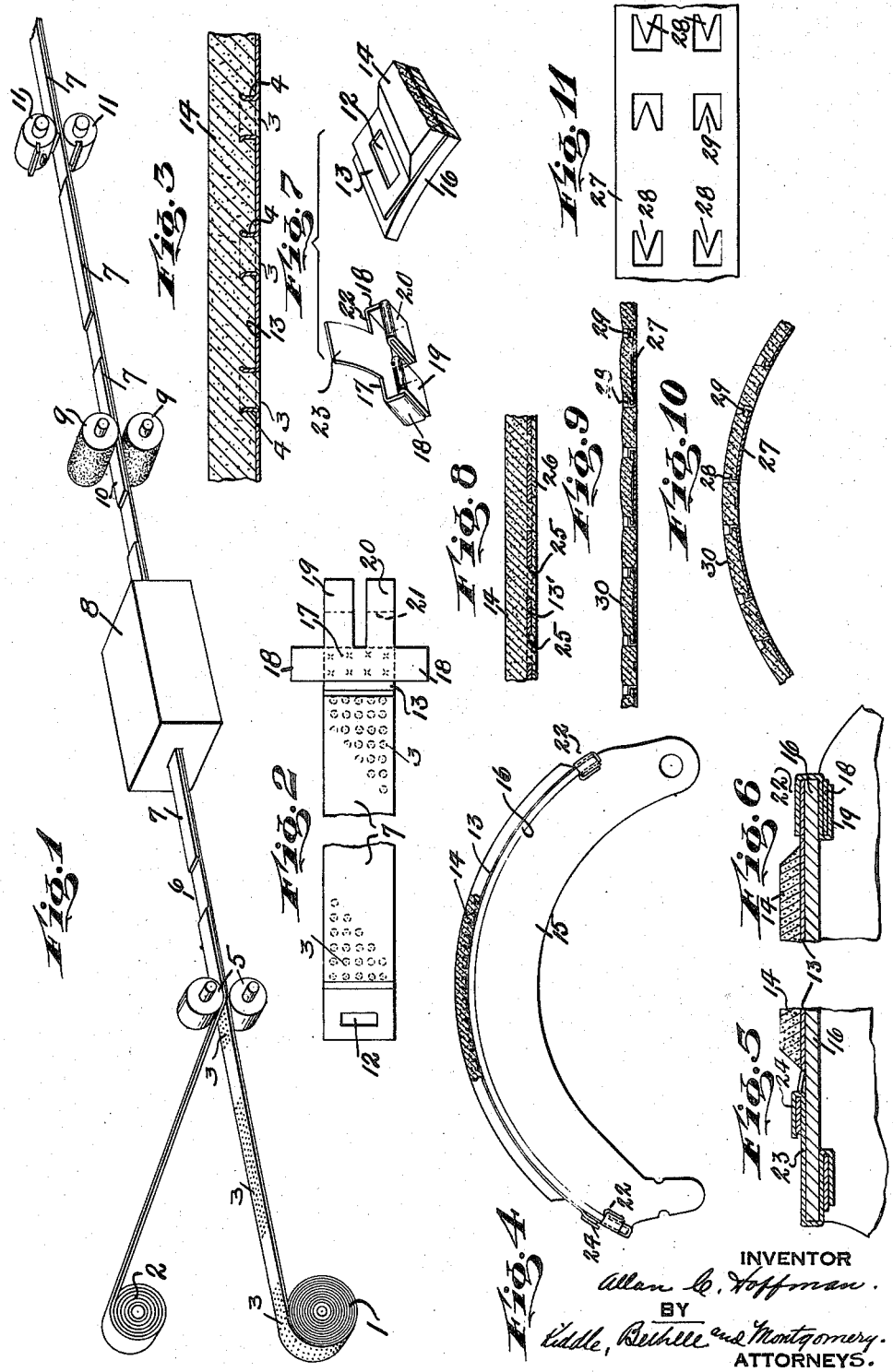

Patented Jan. 5, 1937

2,067,086

UNITED STATES PATENT OFFICE 2,067,086

BRAKE LINING DEVICE

Allan C. Hoffman, Englewood, N. J., assignor to Hoffman Brakes, Inc., New York, N. Y., a corporation of New York Application June 12, 1935, Serial No. 26,102

5 Claims. (Cl. 154—2)

This invention relates to an improvement in brake lining devices and has for one of its objects the provision of a construction in which the friction material of the lining device is attached to a metal attaching strip or band the latter then being attached to a brake shoe.

Prior to my invention it has been customary to rivet the friction material to the brake shoe. Not only does such a construction materially lessen the area of the braking surface of the lining, i. e. that part of the friction material available for contact with the brake drum, but it is difficult to so rivet the friction material to the shoe that the braking surface will take a uniform curve. The contact pressure of the friction material with the brake shoe is often not uniform due to the riveting operation which makes for noisy brakes, uneven wear, etc. Again the lining of brakes by the rivet-method is a comparatively expensive operation and requires a skilled operator. On relining it is of course not only necessary to remove the old lining and rivets but the new lining must be riveted in place in the same fashion as the original lining. Inasmuch as relining is for the most part done at garages and repair shops as distinguished from the brake manufacturer, relining is oftentimes anything but satisfactory.

It will be appreciated also that the rivet type of attachment reduces the depth of friction material available for service to the extent of the height of the rivets above the face of the brake shoe, relining becoming necessary when the lining has worn down to where the rivets contact the brake drum.

The present invention as above pointed out eliminates the necessity of riveting with all the objections to the riveting method, and additionally provides for simply attaching a metal band to the brake shoe, this band carrying the lining material; the band being detached and another assembly substituted on relining.

The present invention also provides for reducing the expense incident to manufacturing my equipment, thereby not only reducing labor costs so far as the actual operation of lining or relining is concerned but effecting considerable saving in cost of manufacture.

More specifically the present invention provides for securing the friction material to an attaching band which is intended to overlie the face of the brake shoe, this band being detachably secured to the brake shoe by fingers provided at each end of the band, the fingers at one end of the band being detachable from the attaching band, this construction, as will be brought out hereinafter, adapting the brake lining device to brake shoes which vary considerably in length. In this connection I might mention that the periphery of the brake shoes on an automobile may vary in length to an appreciable extent in some cases as much as one-eighth to one-quarter of an inch, and inasmuch as my device is applied under a wrapping tension to the brake shoe it is of considerable advantage and quite important that the device be of such construction as to take care of such variations in length in order that I may be assured that the device will always be applied under the wrapping tension desired.

In the accompanying drawings wherein I have illustrated several embodiments of my invention:

Fig. 1 illustrates somewhat schematically the manufacture of part of my improved device in a continuous operation;

Fig. 2 is a plan view of one portion or section of the attaching band;

Fig. 3 is a fragmentary sectional elevational view of the band with friction material attached;

Fig. 4 shows the brake lining device of Figs. 1 to 3 in place on the brake shoe;

Figs. 5 and 6 are sectional views on an enlarged scale showing in greater detail the method of attaching the ends of the metal attaching band to the ends of the brake shoe;

Fig. 7 is a view in perspective of the attaching means or clip shown in section in Fig. 5, and the end of the attaching band with which it is finally interlocked;

Fig. 8 shows in section a modified mode of attaching the friction material to the attaching band;

Figs. 9 and 10 show a further modification in this same connection;

Fig. 11 is a plan view of the attaching band in which a further modification has been embodied;

Fig. 12 is a view similar to Fig. 4 showing a still further modified mode of securing the attaching band to the brake shoe;

Fig. 13 is a plan view of the same; and

Fig. 14 is a view of the clip employed in this embodiment of my invention.

In all the forms or embodiments to be hereinafter described the attaching band is composed of two pieces of material, which as I will also point out, not only assures that the attaching band will be applied with the desired wrapping tension, but assures me that such will be the case despite the fact that the brake shoes to which my device is applied vary in length.

Referring first of all to Figs. 1 to 7, inclusive: 1 designates a roll of strip steel or other suitable material which may be plated on the face to which the friction material is to be applied, the upper face as viewed in Fig. 1, with a suitable metal such as copper or brass, for example. 2 designates a roll of raw or uncured friction material. This material may be the usual moulded brake lining material of which there are several kinds commercially available.

The steel strip or band is punched at intervals, as shown at 3, to provide short projections extending out of the plane of the strip on the upper face thereof as viewed in Fig. 1, these projections being designated 4 in Fig. 3.

The steel strip and friction material are fed together continuously to a pair of presser rollers 5 by which the friction material is pressed with the desired pressure upon the face of the strip steel, the material as will be understood entering the holes provided by the punched areas 3 and flowing about the projections 4. This pressing operation also tends to upset the projections 4 slightly as illustrated in Fig. 3. I might say at this point that the height of the projections 4 as shown in Fig. 3 is somewhat exaggerated. As a matter of fact I have obtained good results by simply providing holes in the band.

In any event it will be appreciated that the friction material is now keyed or bonded to the steel band.

On continued advance of the assembly or composite strip thus provided the friction material overlying the unpunched or unperforated areas 3 between adjacent punched or perforated areas is removed, as shown at 6, by any suitable means such as a scraper, for instance, or by hand, to provide a punched continuous steel band covered at intervals with discontinuous lengths of friction material 7. It will be understood of course that the lengths 7 will vary in length depending upon the length of the face of the particular make of brake shoe to which my device is to be applied.

On continued advance the band and friction material pass through a suitable oven 8 to cure or vulcanize the friction material permanently to the band.

The composite strip next passes between grinding rollers 9 where the working face 10 of the friction material and the underface or surface of the composite strip are subjected to a grinding operation.

After this operation the composite strip passes to punching and cutting-off rollers 11 where the band is punched as shown at 12 in Fig. 2 and cut off into lengths between the adjacent ends of adjacent covered areas of the band. In practice these band lengths will be somewhat shorter than the face of the brake shoe.

Referring to Fig. 4 for a moment, the steel length which constitutes the major portion of the attaching band has been designated 13, and the friction material 14. The brake shoe is designated 15 and the flange thereof 16.

Welded or otherwise conveniently permanently affixed to the attaching band 13 at the end opposite the slot 12 is a piece of metal shaped to provide a cross arm 17 the ends 18 of this cross arm projecting beyond the sides of the attaching band; this piece of metal is also shaped to provide spaced legs 19 and 20 projecting beyond the end of the band. This is clearly illustrated in Fig. 2.

The legs 19 and 20 are bent downwardly out of the plane of the cross arm 17 and rearwardly thereof, and the ends 18 of the cross arm are then bent downwardly and inwardly so as to underlie the cross arm. The legs 19 and 20 are then bent forward again along the line 21. This provides a clip 22 such as illustrated in Fig. 7.

The opposite end of the attaching band 13 is provided with a similar clip 22, this clip, however, not being permanently attached to the band 13.

As mentioned above one end of the attaching band is provided with a slot 12, and in applying my device to a brake 15, the clip 22 at the right hand end of the attaching band is hooked or interlocked with the end of the flange 16 with a leg at each side of the flange and lying snugly against the same.

The detached clip is then slipped over the other end of the shoe flange, and the tail 23 passed through the slot 12 from beneath, and then with any convenient tool the tail is bent over the upper face of the attaching band as shown at 24. In this operation tension is not only placed on the tail of the clip but great wrapping tension on the attaching band so as positively to hold the band and its attached friction material against movement of any kind relatively to the shoe.

In Fig. 8 I have illustrated an attaching band 13' which is of modified construction in that the same is provided with elongated slots 25 instead of the perforations of the band above described. In moulding the friction material 14 to this band the material not only flows through the slots 25 but along the underside of the band as well as shown at 26, so that when this device is applied to the brake shoe there will be a friction material-to-metal contact instead of metal-to-metal as in the form first described. By contacting the friction material with the face of the brake shoe an increased resistance is offered against movement of the device relatively to the shoe.

It will be understood, of course, that the attaching band and friction material are attached to the brake shoe in the same fashion as described in connection with Figs. 1 to 7.

It will be understood also that the friction material of this embodiment of my invention can be moulded to the attaching band in a continuous process such as illustrated in Fig. 1.

In Figs. 9, 10, and 11 a still further modification of my invention has been illustrated. Here the attaching band 27 is provided with oppositely extending prongs 28 and 29 struck out of the band. These prongs are bent upwardly out of the plane of the face of the band and the friction material 30 impaled thereon by the application of pressure. This pressure will cause the ends of the prongs to bend over as illustrated in Fig. 10 securely to hold the friction material to the band. This form is particularly well suited to woven friction material.

The friction material may be applied to the band 27 while the latter is flat, as illustrated in Fig. 9, the friction material and band then being bent into the curved form illustrated in Fig. 10; or applied to the band 27 after the latter has been bent to the desired curvature.

In Figs. 12, 13 and 14 a still further embodiment of the invention has been illustrated. Here I have provided an attaching band 31 with fingers 32 at one end, these fingers being of suitable shape to interlock with one end of the shoe flange 33. These fingers are preferably of thicker gauge metal than the body of the band, but may be integral therewith, or welded or riveted thereto.

In this embodiment of my invention I employ a metal clip 34 at the end of the shoe opposite to the fingers 32. This clip is illustrated on an enlarged scale in Fig. 14, from which it will be seen that a piece of metal is bent into shape to provide a block-like affair, comprising an upper wall 35, end walls 36, front walls or front wall sections 37 and 38, and bottom walls or wall sections 39 and 40. There is no rear wall. In forming the bottom walls or bottom sections and the front wall sections 37 and 38, a space or slot 41 is left in the bottom and front wall, for the reception of the web of the brake shoe, this clip being slipped over the end of the brake shoe flange, the flange passing into the clip from the rear and the web of the shoe entering the slot 41. A slot 42 extending the width of the clip is provided, when shaping the clip, between the upper edge of the front wall and the front edge of the upper wall of the clip. This slot is for the reception of the end 43 of the attaching band. When the clip is applied to the brake shoe, as above described, the attaching band is in place, so that the clip embraces not only the shoe flange but the end of the attaching band, the latter projecting from the slot 42 as shown in dotted lines in Fig. 12. The band 31 is then drawn tightly over the face of the brake shoe with any suitable tool, the fingers 32 having first been interlocked with the other end of the shoe, and with the band under this wrapping tension the end 43 of the attaching band is bent over rearwardly upon the upper wall 35 of the clip to the full line position of Fig. 12. Due to the construction of the fingers 32 and the clip 34 it will be apparent that the attaching band is now immovably affixed to the brake shoe.

It will be evident from all of the foregoing that the present invention provides a brake lining device, in which the friction material is affixed to the brake shoe by a two-piece attaching band.

It will be apparent also that when desired the braking surface of the friction material may be made continuous and unbroken; that no rivets are necessary for securing the friction material to the attaching band; and that in certain of the embodiments described the material can be assembled in a continuous process as described in connection with Fig. 1.

It is to be understood that changes may be made in the details of construction and arrangement of parts herein illustrated and described within the purview of my invention.

What I claim is:

1. The method of making brake lining devices, which method comprises effecting the continuous advance of a continuous strip of friction material and a continuous strip of metal in superimposed relation, applying pressure to the advancing assembly temporarily to bond the two materials to each other, on continued advance of the assembly removing the friction material at predetermined intervals and subsequently subjecting the assembly to heat treatment to cure the friction material and effect a permanent bond between the two materials of the assembly.

2. The method of making brake lining devices, which method comprises effecting the continuous advance of a continuous strip of friction material and a continuous strip of metal in superimposed relation, removing the friction material at predetermined intervals, applying pressure and heat to the advancing assembly to cure the friction material and permanently bond the two materials to each other, subsequently punching the metal at the bared areas and severing the assembly into lengths adjacent the punched areas.

3. The method of making brake lining devices, which comprises punching a continuous metal strip at predetermined areas to provide the same with perforations and projections, effecting the continuous advance of this strip in superimposed relation to a continuous strip of friction material, applying pressure to the advancing assembly to effect an embedding of said projections into the friction material and entry of the friction material into said perforations, on continued advance of the assembly removing the friction material at predetermined intervals, subsequently on continued advance of the assembly heat treating to cure the friction material and then dividing the assembly into lengths at the bared areas of the metal strip.

4. The method of making brake lining devices, which method comprises effecting the continuous advance of a continuous perforated strip of metal and a continuous strip of inperforate friction material in superimposed relation, applying pressure to the advancing assembly to force the friction material into the perforations of the metal strip, temporarily to bond the two materials to each other, on continued advance of the assembly removing the friction material at predetermined intervals and subsequently subjecting the assembly to heat treatment to cure the friction material and effect a permanent bond between the strips of the assembly.

5. The method of making brake lining devices, which method comprises effecting the continuous advance of a continuous strip of friction material and a continuous strip of metal in superimposed relation, applying pressure to the advancing assembly temporarily to bond the two materials to each other, on continued advance of the assembly removing the friction material at predetermined intervals, subsequently subjecting the assembly to heat treatment to cure the friction material and effect a permanent bond between the two materials of the assembly, and subsequently punching the metal and severing into strips at the areas where the friction material has been removed.

ALLAN C. HOFFMAN.